US010638182B2

(12) United States Patent
Kageyama et al.

(10) Patent No.: US 10,638,182 B2
(45) Date of Patent: Apr. 28, 2020

(54) SYSTEMS AND METHODS FOR SIMULATING A SPORTS EVENT ON A SECOND DEVICE BASED ON A VIEWER'S BEHAVIOR

(71) Applicant: Rovi Guides, Inc., San Carlos, CA (US)

(72) Inventors: Tsuyoshi Kageyama, Tokyo (JP); Junya Sekiguchi, Tokyo (JP)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/807,798

(22) Filed: Nov. 9, 2017

(65) Prior Publication Data

US 2019/0141382 A1 May 9, 2019

(51) Int. Cl.

| | |
|---|---|
| ***H04N 21/262*** | (2011.01) |
| ***H04N 21/239*** | (2011.01) |
| ***H04N 21/81*** | (2011.01) |
| ***H04N 21/61*** | (2011.01) |
| ***H04N 21/41*** | (2011.01) |

(52) U.S. Cl.

CPC ... *H04N 21/26291* (2013.01); *H04N 21/2393* (2013.01); *H04N 21/26208* (2013.01); *H04N 21/4122* (2013.01); *H04N 21/6125* (2013.01); *H04N 21/8133* (2013.01)

(58) Field of Classification Search

CPC ......... H04N 21/26291; H04N 21/2393; H04N 21/26208; H04N 21/4122; H04N 21/6125; H04N 21/8133

See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,548,242 B1 | 6/2009 | Hughes et al. | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |
| 2003/0149727 A1 | 8/2003 | Jaschek et al. | |
| 2004/0259577 A1* | 12/2004 | Ackley | H04H 20/18 455/466 |
| 2005/0210501 A1* | 9/2005 | Zigmond | G11B 27/105 725/32 |
| 2005/0251827 A1 | 11/2005 | Ellis et al. | |
| 2006/0161742 A1* | 7/2006 | Sugimoto | H04N 7/17318 711/154 |
| 2006/0200745 A1 | 9/2006 | Furmanski et al. | |
| 2007/0273583 A1* | 11/2007 | Rosenberg | H04W 8/005 342/367 |
| 2009/0262137 A1 | 10/2009 | Walker et al. | |

(Continued)

*Primary Examiner* — Nasser M Goodarzi
*Assistant Examiner* — Adil Ocak
(74) *Attorney, Agent, or Firm* — Haley Guiliano LLP

(57) ABSTRACT

Systems and methods are provided for determining when to refresh data used to generate simulated sports events based on user behavior. When a viewer of a sports event is determined to have stopped viewing the sports event on a first device, the user may seek to watch a simulation of the sports event on a second device. The simulation of the sports event on the second device may be based on sports statistics and historical sports statistics. The simulation is updated based on user actions and characteristics of sports statistics updates.

18 Claims, 11 Drawing Sheets

(56) References Cited

U.S. PATENT DOCUMENTS

| | | | |
|---|---|---|---|
| 2010/0153885 | A1 | 6/2010 | Yates |
| 2012/0072957 | A1 | 3/2012 | Cherukuwada et al. |
| 2013/0110947 | A1 | 5/2013 | Boukadakis et al. |
| 2015/0382076 | A1 | 12/2015 | Davisson et al. |
| 2016/0118084 | A1 | 4/2016 | Hannon et al. |
| 2017/0097678 | A1* | 4/2017 | McLean .................. G06F 3/013 |

* cited by examiner

400

410 420

| Time | Event Information |
|---|---|
| 19:05:02 | S25 AST |
| 19:05:15 | S13 3FGM L14 PF to Lakers S07 STL |
| 19:06:36 | S15 BLK |
| 19:07:28 | To S07 |
| 19:09:04 | S13 FGA L21 DREB |
| 19:10:05 | L21 3FGM L14BLK |
| 19:12:20 | To Lakers S06 STL |

FIG. 4

SYSTEMS AND METHODS FOR SIMULATING A SPORTS EVENT ON A SECOND DEVICE BASED ON A VIEWER'S BEHAVIOR

BACKGROUND

There are many kinds of sports fans. Some watch sports events and simply enjoy the athletic spectacle. Other sports fans have memorized years of team rosters, game histories, player statistics, they dress up for games, and have an emotional investment in a sports event. Most sports fans are somewhere between the two extremes. However, any sports fan can appreciate watching a sports event with sports facts and statistics alongside a sports event display. Providing a model for those viewing such statistics, can enhance a viewer's experience.

SUMMARY

Accordingly, systems and methods are provided for determining when to refresh data, such as sports statistic data, used to generate simulated sports events based on user behavior. For example, when simulations are generated there is a tension between how often to refresh the statistics. By not refreshing often enough the simulation begins to vary too much from the progress of the actual game. By refreshing too often, and thus creating constant starts and stops, the simulation may become unwatchable by a viewer. The media guidance application thus aims to balance these tensions. In an example, the simulated sports event can be provided with a display of a sports event so that a user can view a real time game along with a simulation of the same game using historic and real time game data. Updating the simulation can be performed by a media guidance application using information about a user or a viewer's behavior as well as sets of statistics for the sports event and at a rate determined based on several factors.

In an embodiment, a media guidance application may determine that a user is accessing a transmission of a sports event on a first device. The first device may be any type of device for viewing a sports event, such as a television, portable device, computer, or other device. Generally speaking, the sports event is currently in progress, e.g., in real time. The user may have a second device, such as a portable device or laptop computer, which receives a request from the user to generate a simulation of the sports event on that second device. In an example, a viewer may be watching a sports event on a television and requests a simulation event on a smart phone, or tablet. The simulation may be generated using current and historical sports statistics. Such a simulation may enhance the viewers watching experience by showing a viewer how a team or a player may be expected to perform based on current and historical statistics. This may provide an interesting comparison to a real life version of the sports event, where, for example, players may be under performing, or conversely, performing unexpectedly well.

A simulation may be an animation or graphical representation of the sports event that uses information about players in the sports event and data about the team and players to show a version of the sports event.

In an example, a viewer may wish to view a basketball game on a television screen. In addition, the viewer may select to view a simulation of the basketball game on a split screen or on a second device, such as a smartphone. The simulation may be generated using historical sets of data about the basketball teams playing in the game, player data, data about the venue, and other data. As the game is played, additional sets of data can be supplied for the simulation to update the simulation or provide additional animations or actions for the players.

The simulation may be generated using a simulation application which can be software accessed from a server that is in communication with the television and/or the second device over a network, such as a LAN. In some examples, the simulator may be a video game or an animation service. The simulator may receive data from a database of sports data and can run a simulation of expected plays and interactions for the players. For example, in a team of players having historical sports statistics indicating a certain average number of goals, steals, free throws, assists, blocks, fouls, etc., can result in a variety of simulation possibilities. In an example, the simulator may receive data about starting players, and assign game actions to each player based on the players statistics. In addition, the simulator will assign actions to the opposing team players to generate a simulated game. In some scenarios, a media guidance application will determine what types of simulator services are available to the viewer so that the media guidance application can prompt a user to purchase or select a suitable simulator.

In another example, a user may select a video game to run a simulation and may enter certain parameters for the simulation including players for the teams that may be based on players playing in the current basketball game.

In an embodiment, when a simulation is being initiated, the media guidance application may confirm that the simulator is available and supported to present a simulation on the split screen or second device. For example, a video game application may not be available for simulations and displays on a smartphone and may only work on a computer monitor or a television screen. If the second device cannot support a simulator, the media guidance application may recommend a light version of a simulation such as a text stream of simulated data or an animation feed of game related plays, or a combination thereof.

When the simulation is being initiated, the media guidance application can send details of the game being watched by the viewer to the simulator so that the simulator can retrieve relevant information and details about the game.

A simulation, or an option to offer a simulation on a second device may initiate when a media guidance application determines that the user has stopped accessing the sports event on the first device. In this scenario, the user may have stepped away from the television or computer and then would not know the current state of the sports event. In response to the determination that the user has stopped accessing the sports event on the first device, the media guidance application may record to memory a base timestamp. The base timestamp may correspond to a time when the user stopped accessing the sports event on the first device. The base timestamp may be used as a reference point for the last point in time that the viewer watched the live game and can be a starting point for when a set of sports data for simulation may begin.

A first set of sports statistics for the sports event may be received at the second device. Generally speaking, the sports statistics are transmitted via an Internet protocol. The first set of sports statistics may be marked with a first timestamp for the set to indicate a time when the set of sports statistics was received at the second device. Additional sets of sports statistics, such as a second set of sports statistics for the first sports event may also be received by the second device. The second set (like the first set) of sports statistics is generally transmitted via an Internet protocol, and also is marked with a respective second timestamp indicating a time when the second set of sports statistics was received at the second device. Thus, there are two sets of sports data that have been received by the second device, and each has a respective time stamp indicating when the sports data was received.

A determination may be made by the media guidance application to find a first time difference between the base timestamp and the first timestamp and a second difference between the base timestamp and the second timestamp. These time differences reflect the time elapsed since the point in time when the viewer stopped watching the live game and when the sports data sets are received. The first and second differences may be compared, and the comparison may influence a selection of which set of sports statistics to select for use in the simulation of the sports event. If the media guidance application determines that the first difference is greater than the second difference, the first set of sports statistics may be selected for use in generating the simulation. In this example, the first set of sports data has a greater time difference from the time when the viewer stopped watching the game and so it is the latest version of data between the two sets of data. The simulation may be generated using the first set of sports statistics and the set of historical sports statistics. Thus, the latest version of data is used to run the sports simulation.

Using the set of sports statistics that has a timestamp farthest from the base time, which is when the user has stopped accessing the sports event on the first device, i.e., watching the in progress match, then the simulation can be based on historical statistics, and the most recent version of the sports statistics for the match. In the determination that the first difference (difference of first timestamp and base timestamp) is greater than the second difference (difference of second timestamp and the base timestamp), the most recent set of statistics is used for the simulated game. The second set of statistics would then not be selected for generating the simulation of the game.

In an example, in a basketball game, a first set of data may be received with a time stamp of 4:15 and a second set may be received with a time stamp of 4:13. If the base timestamp is 4:05, then the time difference between the first set and the base timestamp is greater than the time difference between the second set and the base timestamp.

The media guidance application may determine the difference between the base timestamp and the first timestamp, and the base timestamp and the second timestamp may be performed in response to different scenarios. In an example, a determination may be made by the media guidance application that the time when the first set of sports statistics was received at the second device is after the time when the user stopped accessing the first sports event on the first device. In response to this determination, the media guidance application may check the timestamps of the sets of data and compare them to the base timestamp to obtain the first difference.

In some scenarios, the most recent sets of data for a sports event are used to update and run the simulation of the sports event. However, constant updates of the sports event may result in the simulation closing mirroring the actual sports event. If a user prefers to have a simulation that closely mirrors the sports event, the user may set a threshold for data set usage that has a relatively low time period so that the simulation is frequently updated. On the other hand, a user may wish to view a simulation that is not as close to the actual sports event and may wish to rely on historical data to see a version of the sports event that is data driven rather than based on reality. This may be entertaining for a viewer who wants to watch the real game with a friend or another fan at a later time, and does not want to ruin that experience by viewing it earlier, but still wants to see a version of the game that reflects historical information about the players. In this scenario, the user may set a threshold for data set usage that has a relatively longer time period so that the simulation is less frequently updated with real time data. In some scenarios, the user may not want any data set updates until a game has ended or a score has changed. Other benchmarks may also be used for updating a simulation of a sports event.

In an example of using a threshold for controlling when to update data used in a simulation, the media guidance application may determine that the time when the first set of sports statistics was received at the second device is a first threshold amount of time after the time when the user stopped accessing the first sports event on the first device. The threshold amount of time may be set by a user. The first difference may be determined by the media guidance application in response to determining that the time when the first set of sports statistics was received at the second device is the first threshold amount of time after the time when the user stopped accessing the first sports event on the first device. For example, a user may set a threshold time of ten minutes so that the media guidance application compares a timestamp for a set of sports statistics to see whether it is greater than ten minutes from the time the user stopped accessing the live game.

When the game simulation is generated, additional sets of sports statistics may be received by the media guidance application. This may allow the simulation to be updated using more recent information. In an embodiment, the second device may receive a third set of sports statistics for the first sports event. The third set of sports statistics is typically transmitted via an Internet protocol and will be marked or associated with a third timestamp indicating a time that the third set of sports statistics was received at the second device. The media guidance application may determine that the time when the third set of sports statistics was received at the second device is a second threshold amount of time after a time when the simulation was generated. In response to the determination, that the time the third set of sports statistics was received at the second device is a second threshold amount of time after the time when the simulation was generated, a new simulation of the sports event may be generated using the third set of sports statistics and the set of historical sports statistics. The second threshold amount of time may be set by the user. In this scenario, the game simulation can be updated using a set of sports statistics that are received a certain time period after the game simulation was last generated.

Updating the simulation can continue using additional sets of sports statistics, and can continue when there are changes in the sports statistics. In another example, the second device may receive a fourth set of sports statistics for the first sports event. The fourth set of sports statistics is typically transmitted via the Internet protocol and is marked with a fourth timestamp indicating a time when the fourth set of sports statistics was received at the second device. The media guidance application may determine that the fourth set of sports statistics indicates a score change in the first sports event, and in response to determining that the fourth set of sports statistics indicates the score change in the first sports event, the media guidance application may generate a new simulation based on the fourth set of sports statistics and the set of historical sports statistics. Thus, the simulation can be updated using new score based statistics. E.g., if a change in the score is detected in the set of sports statistics and used to update the simulation.

In another example, the simulation may be updated if recent sports event data shows that the event has ended. In particular, the second device, may receive a fifth set of sports statistics for the first sports event. The fifth set of sports statistics is typically transmitted via the Internet protocol, and is marked with a fifth timestamp indicating a time when the fifth set of sports statistics was received at the second device. The media guidance application may determine that the fifth set of sports statistics indicates that the first sports event is no longer in progress. In response to the media guidance application determining that the fifth set of sports statistics indicates that the first sports event is no longer in progress, a new simulation is generated based on the fifth set of sports statistics and the set of historical sports statistics. Thus, in this example, if a game has ended and that is detected in the set of sports statistics and used to update the simulation to show that the game has ended.

The simulation may also be updated based on a user action. In an example, the media guidance application may prompt the user to request a new simulation. The media guidance application may determine that the user has resumed accessing the transmission of the first sports event on the first device. In response to determining that the user has resumed accessing the transmission of the first sports event on the first device, the media guidance application may prompt the user to generate a new simulation.

The use of sports statistics for generating the simulated sports event may also be based on the availability of real-time data. In an example, the simulated sports event can be provided with a display of a sports event so that a user can view a real time game along with a simulation of the same game using historic and real time game data. Updating the simulation can be performed by a media guidance application using information about the availability of statistics for the sports event. In an example for a basketball game, the user may view a live game and may wish to view a simulation of the game alongside the live game, or on a separate device if the user has, for example, stopped watching the live game.

In an embodiment, a media guidance application may receive, at a first device, a user request to generate a simulation of a first sports event that is currently in progress on the first device. The simulation may be based on current and historical sports statistics. The current statistics for the sports event may be data from the event that is obtained from a sports database source such as a sports league or a news source. When the user request to generate a simulation is received by the media guidance application, the media guidance application may request a base set of sports statistics for the first sports event. The media guidance application may also retrieve a set of historical sports statistics for use in generating the simulation and a threshold difference. The threshold difference corresponds to a required amount of time for triggering a refreshment of the simulation and may be based on a more current set of sports statistics for the first sports event. The threshold difference may be set by a user, or set using a default threshold. For example, a user may set a threshold time for updating a simulation of a sports event to be a portion of a period of the event, such as half of a basketball quarter.

The first device receives a base set of sports statistics for the first sports event. In general, the base set of sports statistics is transmitted via an Internet protocol and the base set of sports statistics is marked with a base timestamp that indicates a time when the base set of sports statistics was received at the first device. The media guidance application will run, at the first device, a simulation based on the base set of sports statistics and the set of historical sports statistics. While the simulation is being run, additional sports statistics will be received in order to update the simulation. The first device may receive a first set of sports statistics for the first sports event. The first set of sports statistics is typically transmitted via the Internet protocol, and will be marked with a first timestamp indicating a time when the first set of sports statistics was received at the first device. The time stamps associated with the sets of sports statistics can be used to determine the age of the sports statistics. The media guidance application may determine a time difference between the time stamps for the sports statistics sets in order to select one or more sets for generating the simulation, and updating the simulation.

The simulation may be run using a simulator application which may be a dedicated sports simulation application that may be run locally on the media guidance application or remotely at a server. In some examples, the simulation may be run using a video game that may be server based and available remotely via a network, or operated locally using video game hardware that the user may have connected to the media guidance application on a home network. Other combinations of simulator applications and hardware may be used to provide the features and functionality described herein. In some examples, the simulator may be suitable for providing a simulation on a laptop display or a tablet, but it may be limited for view on a smartphone. In that case, the simulator on a smartphone may be a light version of the simulation and may have only some features displayed on the smaller screen, or only features that the user may have selected for the simulation.

To determine which set of data to use in the simulation, the media guidance application may determine a first difference between the base timestamp (i.e., the time the base set of sports statistics was received) and the first timestamp (i.e., the time associated with the first set of sports statistics). The first difference and the threshold difference are compared by the media guidance application and if the first difference is determined to not exceed the threshold difference, the simulation will continue to be run. Thus, in an example, the time difference threshold can be used to set a time for how age or staleness of statistics used to generate the sports event simulation. In the basketball example, for a set of data that is older than a half quarter, a simulation may be updated. If the simulation is running on a set of data that is less than half a quarter old, then the simulation may continue. Time in minutes can be used for the threshold setting, or a time period, e.g., a half quarter. If it is the latter, the half quarter time period would differ between games played in NBA, WNBA and college basketball.

If a set of sports data statistics is received, but a base or prior set of statistics is determined to be within an age threshold, the prior set of statistics may continue to be the basis of the simulation. In this way, a simulation can be run and updated with a frequency that suits the application, and also the user or viewer's preferences.

As the simulation runs, the statistics used to generate the simulation will continue to age. At a predetermined time after the simulation has been running, the media guidance application may determine a second timestamp, wherein the second timestamp indicates a current time. The media guidance application may determine a second difference between the base timestamp and the second timestamp. The second difference is compared to threshold difference. If the second difference does exceed the threshold difference, then the media guidance application will generate a new simulation. Thus, if the difference in a current time of the simulation and the base time—i.e., when the simulation began running—exceeds a threshold, then the simulation data may be too old and a new simulation may need to be generated. The new simulation can be based on a second set of sports statistics and the set of historical sports statistics.

As the simulation continues to run, additional sets of sports statistics may be received. The first device may receive a second set of sports statistics for the first sports event. The second set of sports statistics is typically transmitted via the Internet protocol, and is marked with a third timestamp indicating a time when the second set of sports statistics was received at the first device. In order to determine which set of sports statistics to use, and whether the simulation should be updated with new sports statistics, the media guidance application may test the age of the sports statistics. The media guidance application may determine that the third timestamp is after the first timestamp, and in response, will select the second set of sports statistics for use in generating the new simulation. The new simulation may then be generated based on the second set of sports statistics and the set of historical sports statistics.

In some scenarios, the media guidance application may prompt the viewer or a user to request to generate the new simulation. In some embodiments, the simulation may be generated remotely from the first device and transmitted to the first device.

In some embodiments, the threshold difference is used to set a time or age for the sports statistics to be used in generating a simulation of a sports event. In some scenarios, the threshold difference is set by a user. In other scenarios, the threshold difference may correspond to a required amount of time for triggering the refreshment of the simulation based on a more current set of sports statistics for the first sports event while the first device remains in communication with a source of sports statistics.

Another way to determine when to update the simulation of the sports event may be based on changes in the sports event that may be occurring in real time. For example, the media guidance application may determine that the first difference does not exceed the threshold difference, but will determine that the first set of sports statistics indicates a score change in the first sports event. Such determination that a score change has occurred, may cause the media guidance application to respond by generating a new simulation based on the first set of sports statistics and the set of historical sports statistics.

In another example of a change in the sports event, the media guidance application may determine that the first difference does not exceed the threshold difference, but will determine that the first set of sports statistics indicates that the first sports event is no longer in progress. Such determination that the sports event is no longer in progress, may cause the media guidance application to respond by generating a new simulation based on the first set of sports statistics and the set of historical sports statistics.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 4 shows an illustrative example of sets of sports statistics in accordance with some embodiments of the disclosure;

DETAILED DESCRIPTION

Systems and methods are described to simulate a sports event using sports data for an event as well as historical sports data. In particular, a media guidance application may receive a request to generate a simulation of a sports event, for example, a sports event that a user is viewing. The media guidance application may receive sports event related data, including historical sports data from a database of sports statistics, and current sports statistics for the sports event to generate a simulation of the sports event. Given that there is a multitude of sports related data for teams, players, fields, as well has information about factors affecting each, e.g., a temperature of a location for a match, current health status of a player, orders of players, and other details, that may affect a match, it can be interesting for a sports fan to view a live game along with a simulation of the game that is based on historical and current sports data. In this way, a viewer could see a version of a sports game where each player and team played according to statistics. This simulated version of the game could be similar or quite different than the actual game because players may be playing better than expected, or underperforming.

In some examples, the sports event simulation can be updated and revised using more current information in the form of updates in sets of data for the game. However, constant updates of the simulation may be confusing for the viewer, thus, updates to the simulation may be based on thresholds of time that are set by the user, age of the data, user behavior, score changes in the event, and/or a game finishing or pausing. In another example of the game simulation, a viewer may view a game on, for example, a television with cable access, or a device connected to the Internet. The viewer may then need to change locations or lose the Internet connection or game feed in which case the viewer may need to view a simulation of the game. Or perhaps a sports fan has promised to view a game with a friend at a later time, but the sports fan wants to experience some version of the game without viewing the real event in advance of watching it with the friend. Other situations can also cause a viewer to wish to view a simulation of a game.

Figure 1:
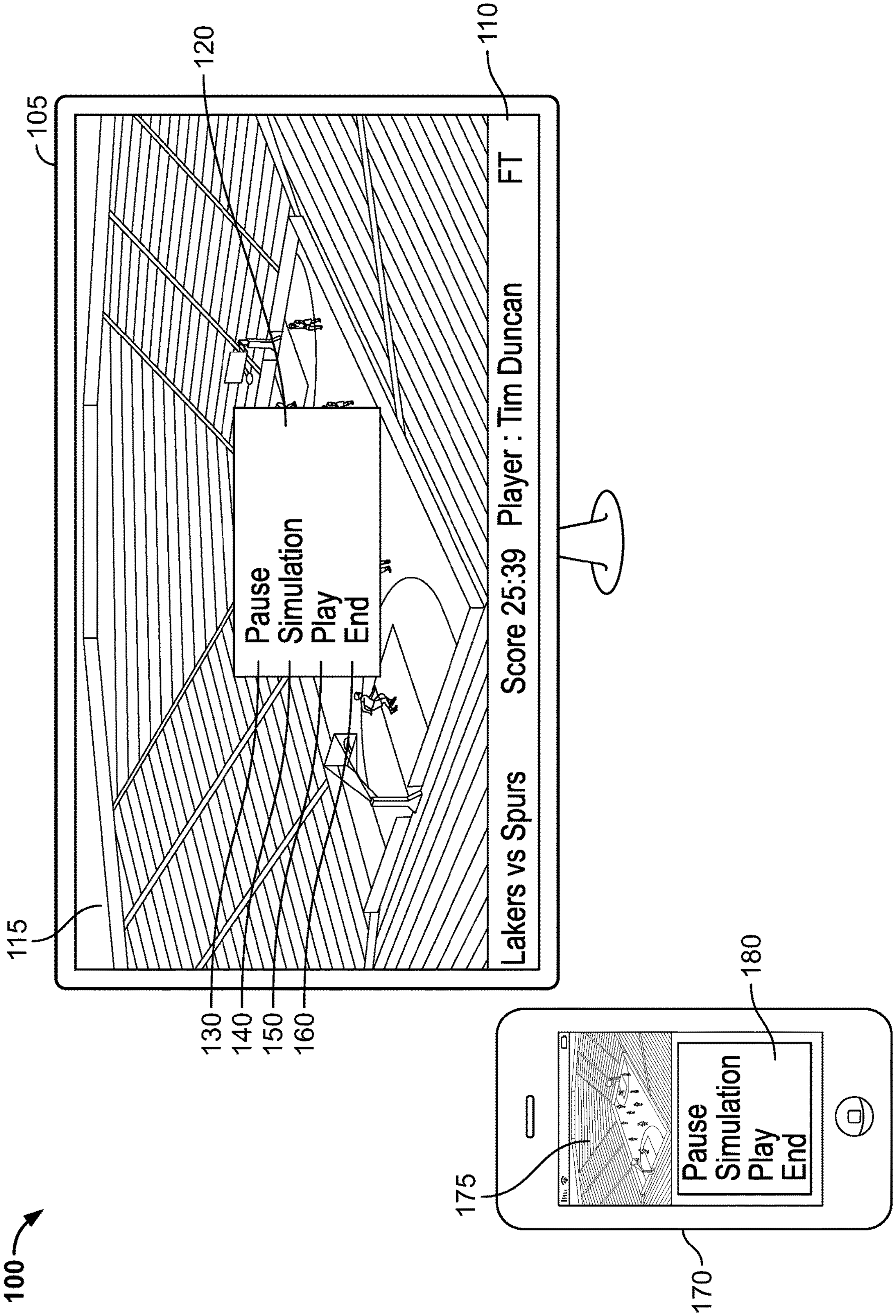
FIG. 1 shows an illustrative example of a display screen generated by a media guidance application in accordance with some embodiments of the disclosure.

FIG. 1 depicts display screens for viewing a sports event. A television screen 105 may show a sports event 115, such as a basketball game, and include details about the sports event in the banner 110. Some examples of details about the sports can be team information, score, players, sports statistics, updates on the current status of the game, highlights, and other details. As shown in FIG. 1, banner 110 shows the teams playing in the game, a current score, and information about a player Tim Duncan—that he has a free throw. The information used in the banner 110 can be supplied from a media guidance application database of sports content, as well as supplied in a feed for the sports event. A viewer of the sports event 115 may interact with the display screen 105 using a media guidance application to select options for viewing the sports event, for example, using the options in window 120. For example, the viewer may seek to pause 130 the sports event, generate a simulation 140, play the event 150, or end 160 viewing the sports event 115. Other options could also be presented to the user for interacting with the sports event 115. The options window 120 can be obtained using the media guidance application by selecting an options button. In some scenarios, the options window 120 may be displayed during a pause in the event, or if the media guidance application senses that a viewer may wish to request a simulation of the event. For example, the media guidance application may sense an interruption in the sports event feed, or in a network supplying the screen 105.

Media viewers often view media on multiple device simultaneously, thus, another screen 170 is depicted in FIG. 1. Although television screen 105 and a portable device 170 are depicted, any combination of devices can be used for the features described herein, including tablets, smartphones, laptop computers, computers, televisions, etc. The portable device 170 may include a display of the sports event 175. The sports event 175 may be overlaid with an options window 180, similar to the options window 120, which allows a user to interact with the device 170 to request options (e.g., pause, simulation, play, end, etc.) for handling display of the sports event 175. Although not shown, the portable device 170 may also include sports statistics and other features to enhance viewing of the sports event 175.

Figure 2:
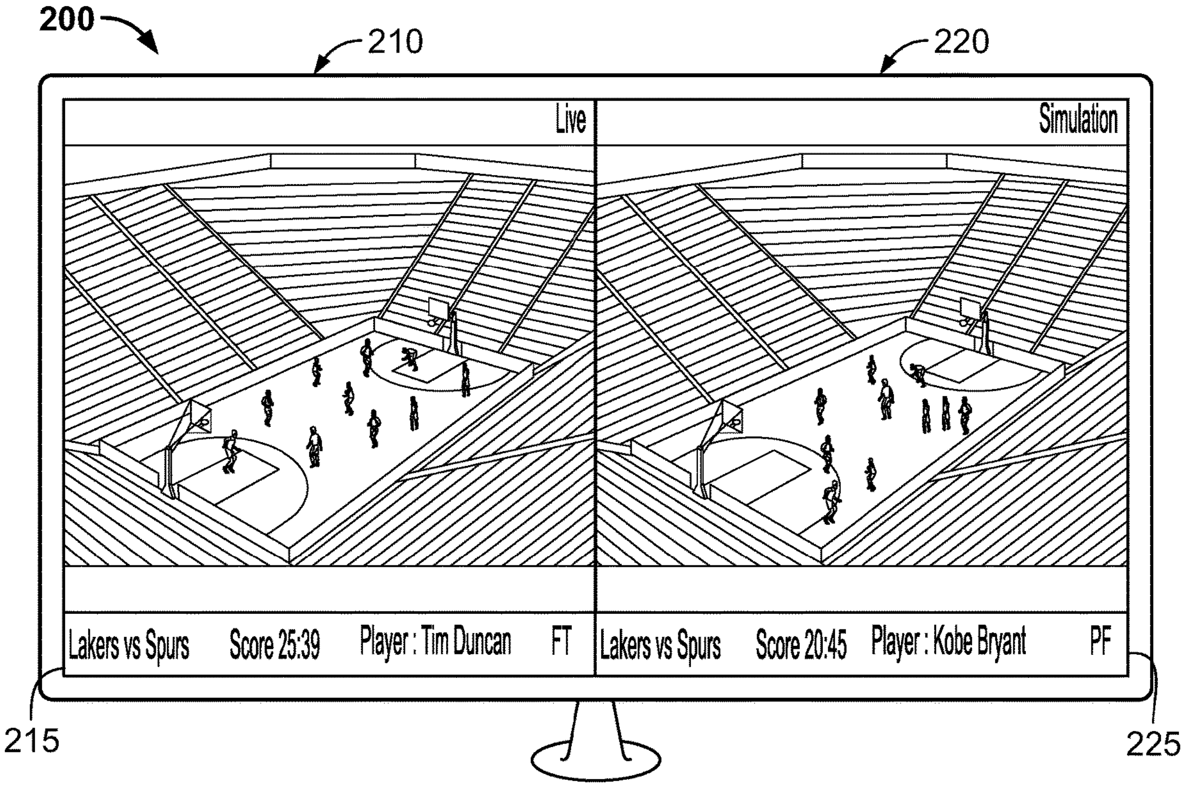
FIGS. 2-3 show illustrative examples of a display screen of a simulated sports event generated by a media guidance application in accordance with some embodiments of the disclosure.

If a user selects the option "simulation" 140 from the options window 120 (or the respective option in window 180), a simulation screen may be presented as shown in FIG. 2. In another scenario, a media guidance application may sense that a viewer is no longer watching the sports event 115, and may automatically generate a simulation screen as shown in FIG. 2. In either scenario, the display screen 200 may depict the sports event 210 as well as the simulation 220 in the same display screen 200. In another situation, not shown, however, the viewer may wish to only view the simulation 220 in the display screen 200, in which case, the sports event 210 would not be visible. In another scenario, the simulation 220 may be shown on a second device without a display of the sports event 210.

When a simulation is requested, the media guidance application may search for a suitable simulator to present the simulation. The simulator may be a simulation application, software capable of generating the simulation, or a video game. The simulator may be connected to the display device 200 via a network and may have access to a database of sports statistics. In some scenarios, a user may be able to select parameters for generating the simulation including, for example, player selections, simulation update frequency, or other parameters. In some examples, a media guidance application may not be able to find a suitable simulator application that is available for a user. In this case, the media guidance application may search an application database and recommend an application for the user to access to generate the simulation.

Although display 200 is shown as a television screen, it may also be portable device. Some portable devices may not be compatible with some simulation applications. In this case, the simulation application may present a light version of a simulation including text streams of game information and one or more animations for the game. For example, for a basketball game, the simulator may send action play text and show an image of a player shooting a basket. In another example, the simulator may be able to generate on the fly animations of players moving around the basketball floor, passing a ball, shooting baskets, and other basketball actions.

Display 200 may include relevant information about the sports event 210 and simulation 220 with sports details 215 and 225, respectively. As shown, these details may have similarities, e.g., the same teams Lakers vs. Spurs playing the sports event, but may differ with scores and player names based on differences that may occur in the actual version of the sports event, and in the simulated version of the sports event. For example, as shown in the sports event 210, a player Tim Duncan is taking a free throw and the score is 25:39. In the simulation version of the event 220, Kobe Bryant has a personal foul and the score is 20:45. The differences between the versions of the event can indicate that the simulation version is not exactly following the real live game and simulated versions of the player statistics may yield different outcomes. For example, a player Kobe Bryant playing on the Lakers, along with his teammates may have certain expected scoring patterns, defensive and offensive behaviors, and likewise, the Spurs players will have respective player statistics. The simulator can match up players on each team as pairs of offense/defense players and determine an expected outcome for interactions between the players. In addition, the simulator can take statistics from within a team, e.g., assists, block, steals, points per game, etc., to generate an expected outcome for the players in the team. In an example, an animation of a beginning point to the expected outcome may be used as a simulation of the event. As more data points become available for the event, the simulation may be updated to generate a new animation of the players from that point in time.

In some scenarios, the simulation may be initiated by a request from the user or when the media guidance application detects that a user is not watching the sports event anymore. In some examples, a viewer may wish to see a sped up version of the sports event. In this case, the viewer may request a simulation and a simulator will use current and historical data to create an animation of expected plays in a compressed format so that the animation plays from beginning to end in a shorter time than the duration of the sports event. Such a simulation may be interesting to watch for a sports viewer for example, during a commercial break.

In another example, a future simulation of the sports event may be created in an animation using historical statistics from the sports team to create a predicted version of the sports event based on current sports statistics and historical statistics. Such a simulation could include the largest plays expected for the players.

Although the features discussed herein are described in the context of sports, the simulations and updates could be applied in other contexts, for example, reality shows or other media types having a corpus of historical statistics.

The display screen 200 may be provided on any type of device, e.g., a television screen (e.g., 105, FIG. 1), a portable device (e.g., 170, FIG. 1), a smartphone, tablet, computer, user equipment or other device capable of displaying a sports event and/or a simulation of the sports event. The display screen 200 may have its own processing capabilities and connections to databases of sports information and have a feed for media content, or it may operate over a network (e.g., a LAN) and receive data and media content from another device, such as a media guidance application.

Event data may be supplied to the display 200 from a stream or feed for the sports event, and enhanced using sports statistics details which may be provided by a sports statistics database that is connected to the media guidance application. As the game continues, for example, score details for the event may be received in a set of score statistics. If the score in the simulated game differs from the real event, e.g., as shown in 200 between game displays 210 and 220, a simulation update may be made. In some examples, a simulation update may be time based so that as new sports statistics for the event are received, they can be incorporated into the simulation. In other scenarios, differences in data between the real event and a simulation version can trigger a simulation update. For example, when there is a difference in the score of the game and the simulation version of the game, an update to the simulation may be run. In another example, if the game has finished or ended, the simulation may also be updated to end. Other benchmarks for the game can also be used as a basis for comparing a simulation. Thresholds for differences may be set by a user, e.g., if a score differs from the real game and the simulation by more than 10%, then a simulation may be updated. Alternatively, if more than one player on a team is changed or substituted, then a simulation may be updated using player data for the substituted player. When such simulations are updated, current versions of sports statistics may be used, and historical sports statistics.

Figure 3:
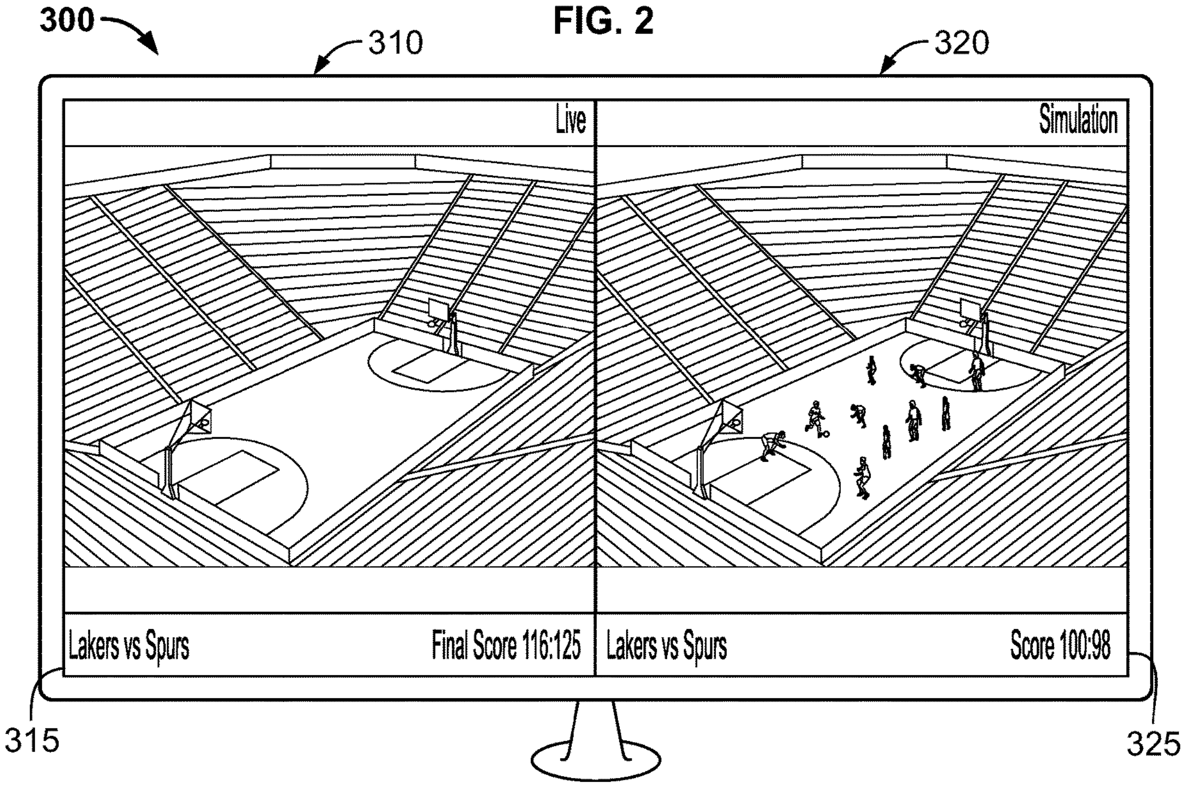

When a game ends, e.g., as shown in FIG. 3, a live or real version of the game 310 may show that the game has finished and that there are no more players on the floor. A final score 116:125 for the game may be shown in a banner 315. A simulated version 320 of the game may be depicted with game play continuing and may have a score, e.g., 100:98 shown in a banner 325. Since the scores for the simulated game and the real game differ, a simulation update may be initiated. The simulation may be initiated because the scores differ by a certain percentage, and also because the scores reflect different teams winning. In addition, since the game has ended in 310, the simulation 320 may be updated to reflect that the game has finished. As sports data is received over the duration of the game, the simulation can be updated based on data sets according to certain rules about when to perform the updates. As described with reference to FIG. 2, the simulation 320 shown in FIG. 3 may be presented on a separate device without showing the sports event 310.

An example of how sports data can be stored in memory in a database is shown in FIG. 4. As shown, a database table 400 can include times 410 for events occurring in a sports match. The times 410 can be associated with respective event information 420. The event information 420 can be sports statistics and details about the sports event. The event information 420 may be recorded continuously at periodic time intervals, or based on an occurrence in the game. For example, event information 420 may be recorded in an interval, e.g., every ten seconds of a game, or when a point is scored, or a player performs some action. Some examples of the sets of data can indicate actions in the game. For example, as shown in FIG. 4, a Spurs player 25 may have an assist to Spurs player 13 who then scores a three point field goal made. Later, a Laker player 14 may have a personal foul then a turnover to the Lakers. Continuing in the game, a Spurs player 07 may steal the ball, and Spurs player 15 may block the ball and then a turnover occurs. Then, Spurs player 07 and Spurs player 13 may have a field goal attempt. The Lakers may turn around with Lakers player 21 having a defensive rebound and then scoring a three point field goal. The Lakers may continue with Lakers player 14 having a block and causing a turnover. Then Spurs player 06 steals the ball. As the game continues, more details about the game may be recorded as sets of data about the game. Such statistics may be used, together with information about the team and players in historical statistics to generate simulation of the game. For example, when a simulator receives data indicating that Lakers player is making three point throws that the player typically does not make, such information may inform the simulation that the player is playing better than expected, and so the simulation may tip more to that player. In another example, the simulator may receive data indicating that one Spurs player is being blocked consistently by a Lakers player. Such information may cause the simulator to change the animations and outcomes to reflect the current data.

The event information details 420 can be recorded and associated with a time 410. When the sets of event information 420, and associated time 410, are shared with the media guidance application, the media guidance application can use the event data 420 for creating a simulation of the game. The time 410 details for the sports event data sets 420 can be checked by the media guidance application to ensure that the simulation is being generated based on the most suitable and relevant statistics.

The systems and methods may be implemented via an interactive media guidance application running on a user device, a remote server, or another suitable device. The interactive media guidance application may be implemented partially on multiple devices such that some portions of the interactive media guidance application are executed on one device while other portions of the interactive media guidance application are executed on another device.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 5:
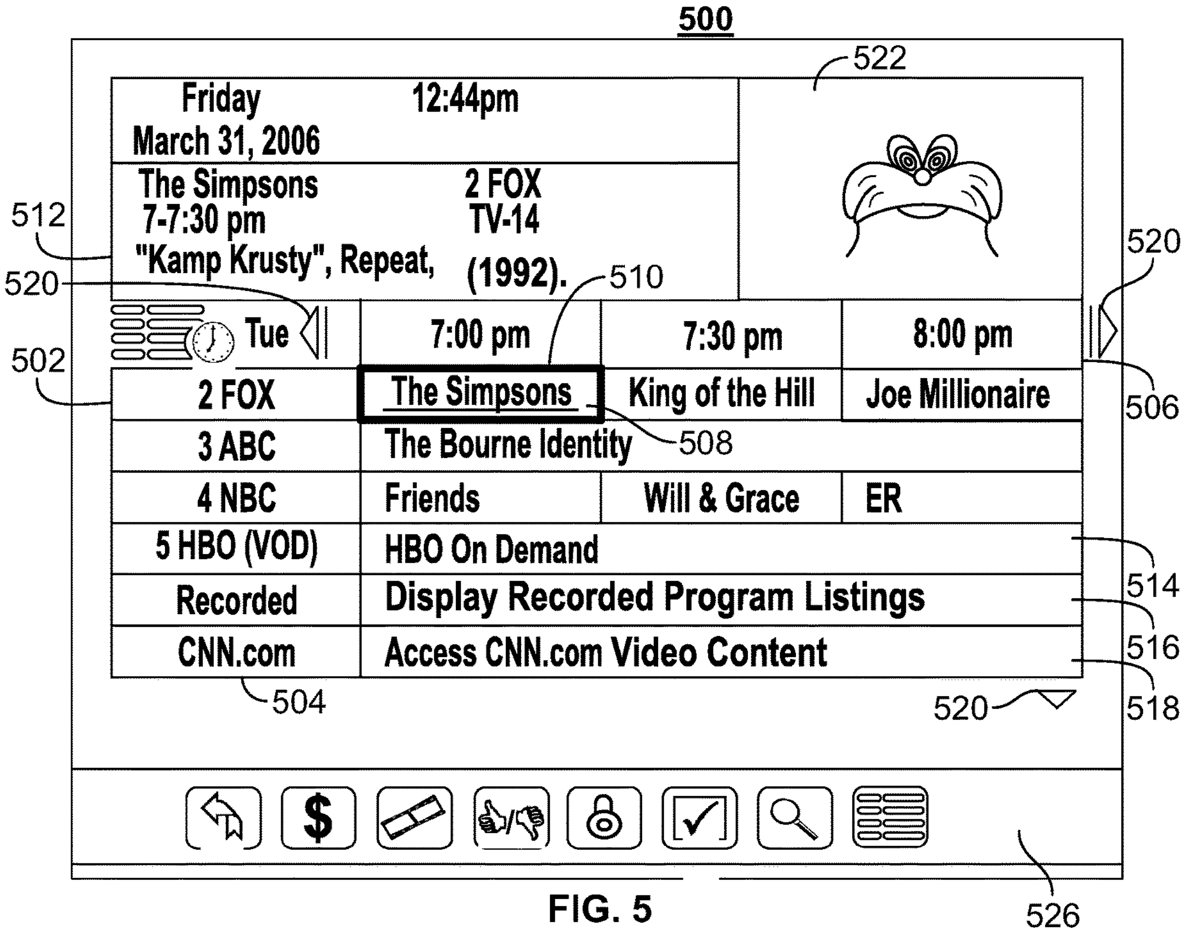
FIGS. 5-6 show other illustrative examples of display screens generated by a media guidance application in accordance with some embodiments of the disclosure.
Figure 6:
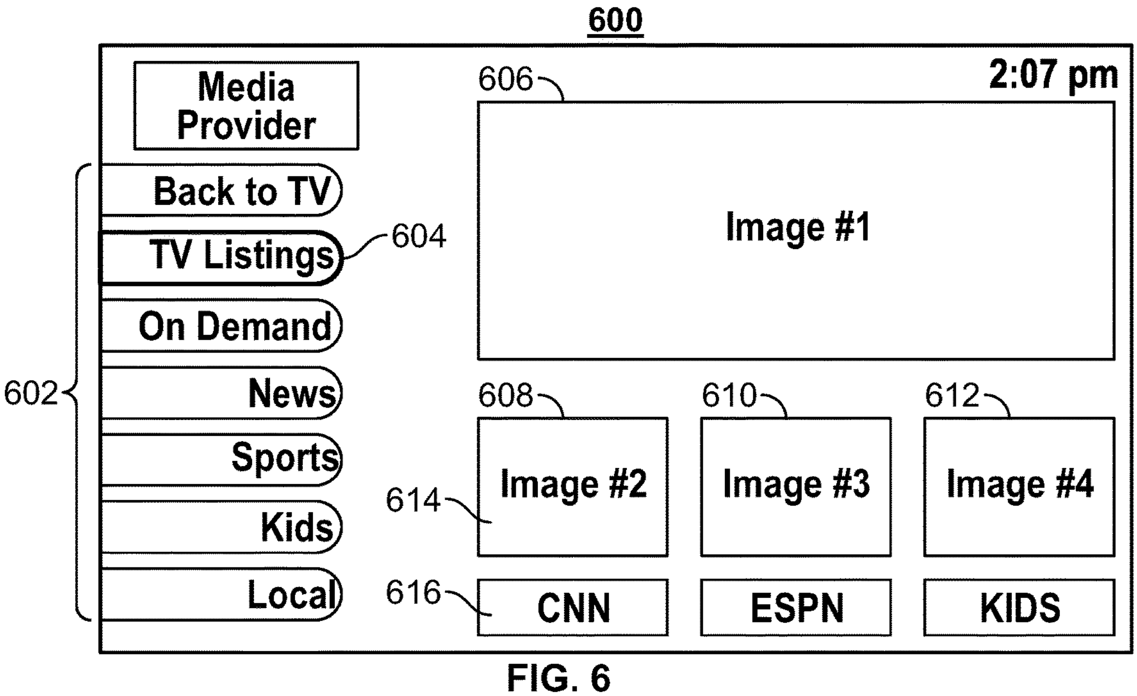

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 7:
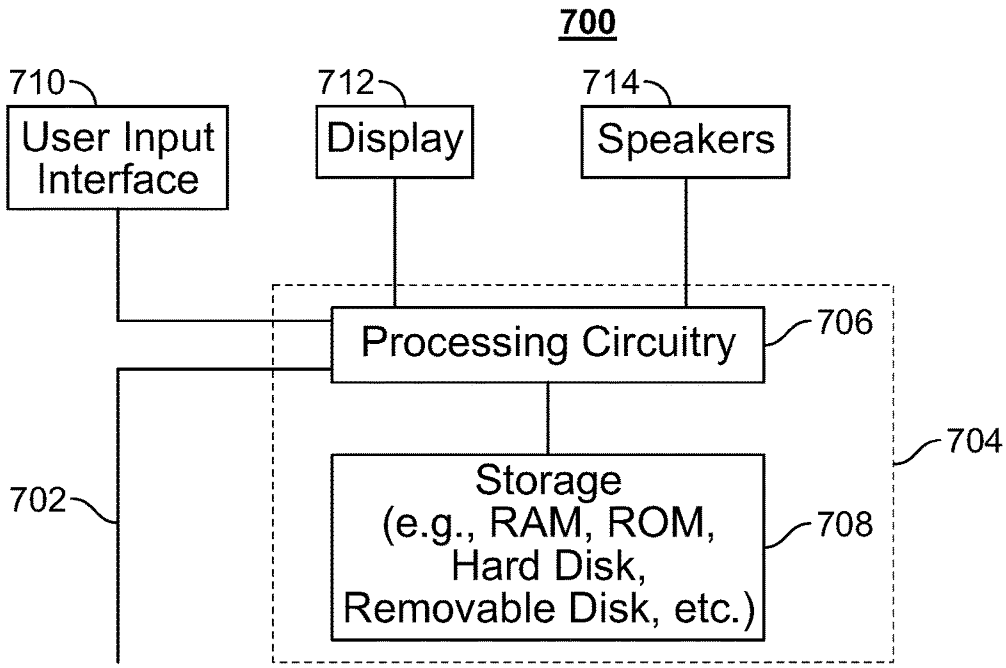
FIG. 7 is a block diagram of an illustrative user equipment device in accordance with some embodiments of the disclosure.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
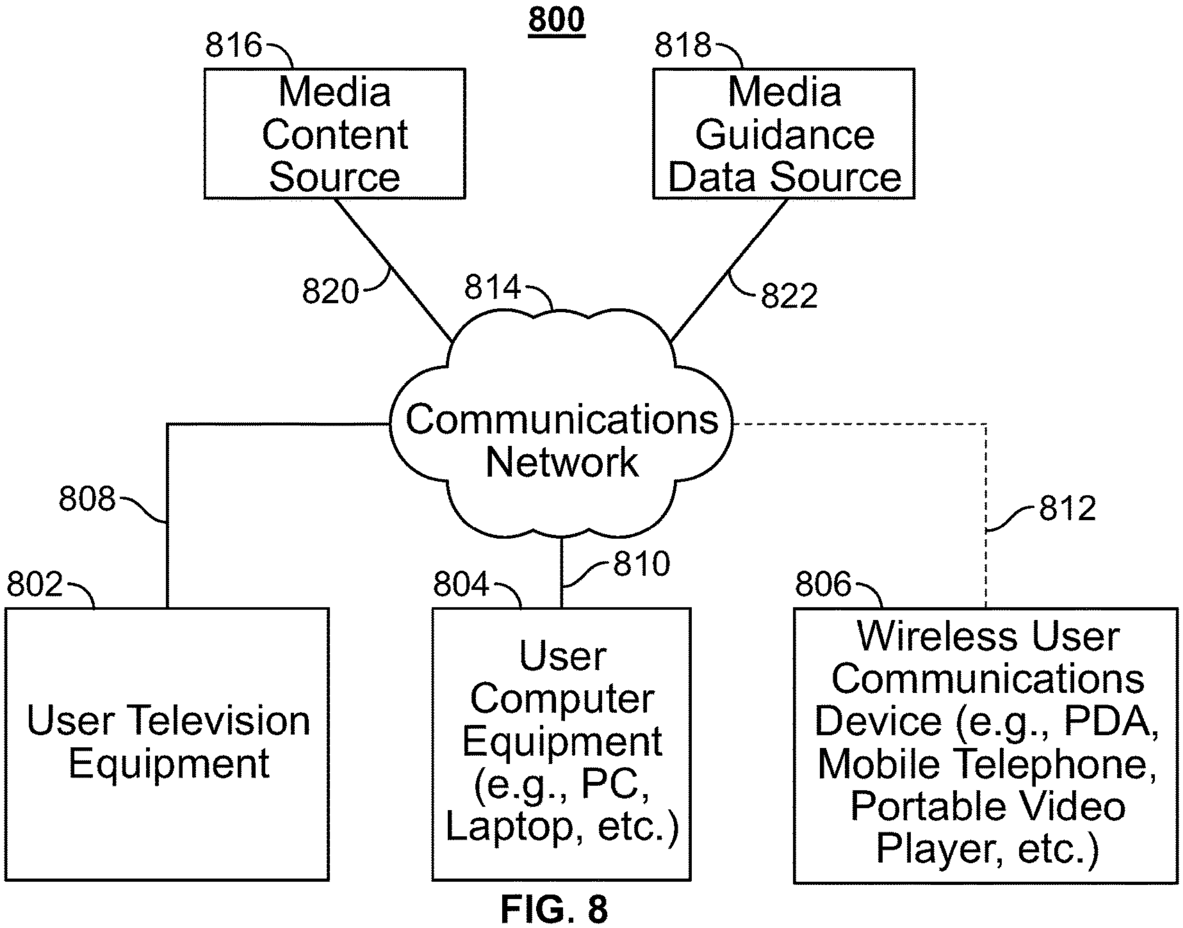
FIG. 8 is a block diagram of an illustrative media system in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 9:
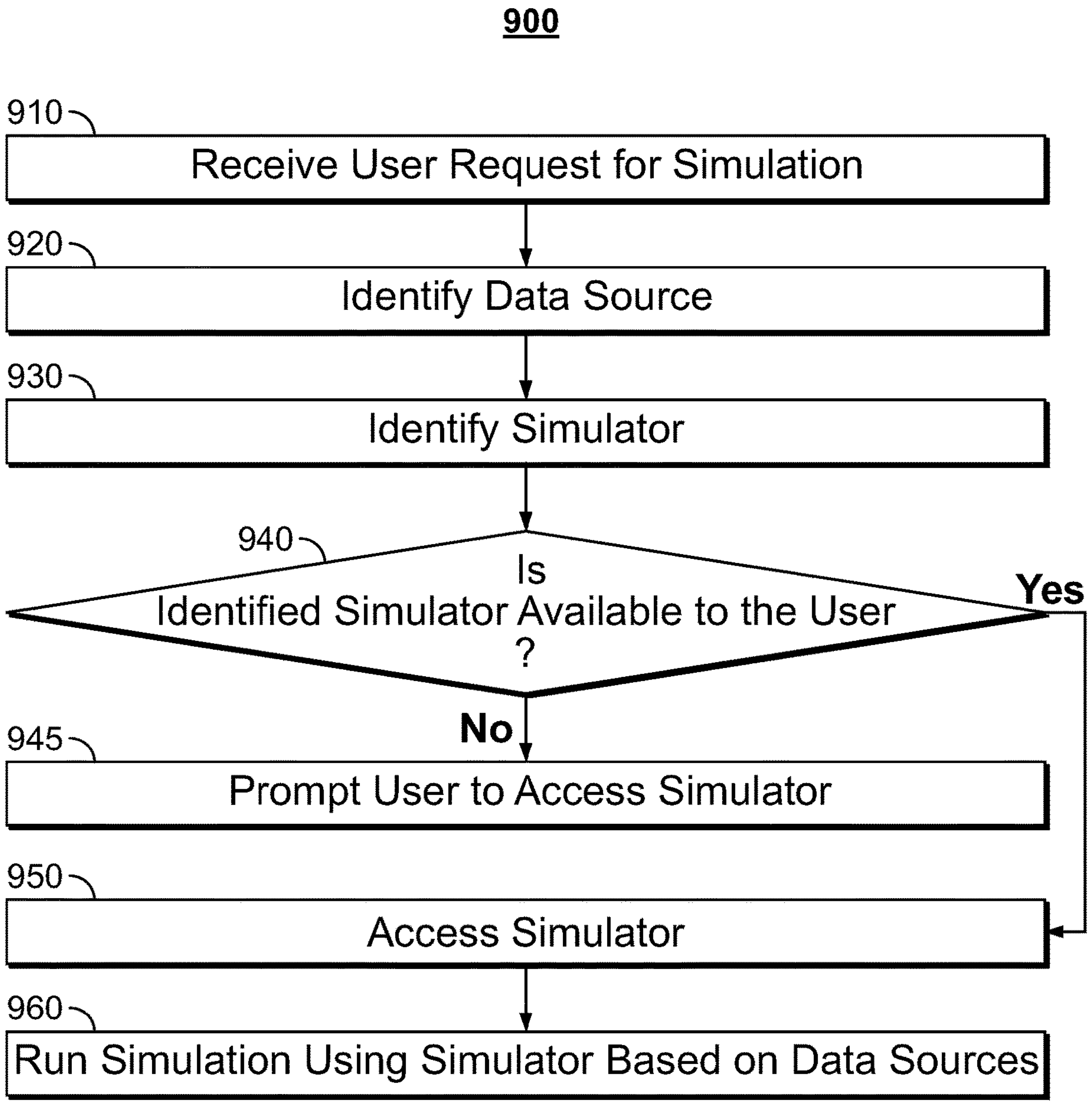
FIGS. 9-10 are flowcharts of illustrative processes for running a simulation for a sports event in accordance with some embodiments of the disclosure.

FIG. 9 is a flowchart of illustrative steps of a process 900 for initiating a simulation of a sports event in accordance with some embodiments of the disclosure. It should be noted that process 900 or any step thereof could be performed on, or provided by, any of the devices shown in FIGS. 7-8. For example, process 1000 may be executed by control circuitry 704 (FIG. 7) as instructed by a media guidance application implemented on a user device (e.g., user equipment devices 802, 804, and/or 806 (FIG. 8)) in order to generate a simulation of a sports event. In addition, one or more steps of process 900 may be incorporated into or combined with one or more steps of any other process or embodiment described herein.

FIG. 9 depicts a flowchart of illustrative process 900 for running a simulation of a sports event in accordance with embodiments of the disclosure. A simulation of a sports event may be initiated in response to a user request for a simulation that is received, at step 910 by control circuitry 704 of a media guidance application. Generally speaking, the simulation request may be provided by a user selecting a simulation option from a display screen, e.g., from options windows 120 and 180 (FIG. 1). In some scenarios, the simulation request may be received by the control circuitry 704 of a media guidance application automatically if a user is determined by the media guidance application to have stopped accessing a sports event on a device. If a user is watching a basketball game on a television, for example, the user may wish to see a simulation of the event on a split screen display, or on a second device so that the user can view an automated version of plays by the teams in the game.

After the request for the simulation is received, the control circuitry 704 of a media guidance application will identify a data source at step 920 for the simulation. The data sources may be one or more sources of sports data that are available to the media guidance application, e.g., media content source 816 (FIG. 8), including sports encyclopedias, sports association feeds, e.g., NBA data feeds, sports newsfeeds, e.g., ESPN data feeds, and other sources. Some sports data sources may be available to subscribers only. The media guidance application may determine that some data sources for the sports event are not available to the user and may offer an option to the user to subscribe to the data source to enhance the simulation.

In addition to identifying sports data sources, the media guidance application will identify a simulator application to run the simulation at step 930. Steps 920 and 930 may be run at substantially the same time. In some scenarios, databases of sports data may be available via a simulator application only. Simulation applications may be server based applications that are accessed by the media guidance application using a network. Simulation application may also be video game based and which may be running on hardware that is local to the user and connected to the media guidance application using a home network. The video game based applications could also be server based and connected via home and Internet networks. The control circuitry 704 of the media guidance application may determine whether any simulators are available to run a simulation of the sports event. At step 940, the control circuitry 704 of the media guidance application may determine if any of the identified simulators are available to the user. For example, some simulators may be subscription based, some may only be available for certain types of devices, e.g., some may not be suitable for a smartphone, some simulators may only have access to certain data sources that may or may not be relevant to the sports event.

If a sports simulator is determined to be available to the user at step 940 by the media guidance application, the user may be provided access to the simulator at step 950, which may be a transparent to the user, or may require subscriber log ins or other access. If, however, identified sports simulators are determined to be not available to the user at step 940, the media guidance application may prompt the user to access a simulator at step 945. In this scenario, the media guidance application may display additional pop-up windows in a display screen of a media device for the user to select one or more simulator applications for running the simulation. The options displayed for the user's selection may include more than one choice of simulation applications, sports database access choices. In addition, the user may have an option to select a light or limited version of a simulation application with limited features, or a feature laden simulator, or features in between these.

At step 960, the control circuitry 704 of the media guidance application may run a simulation using the simulator and using the identified data sources. Thus, the simulation may commence using an identified simulator using sports data that is relevant to the sports event.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 9.

Figure 10:
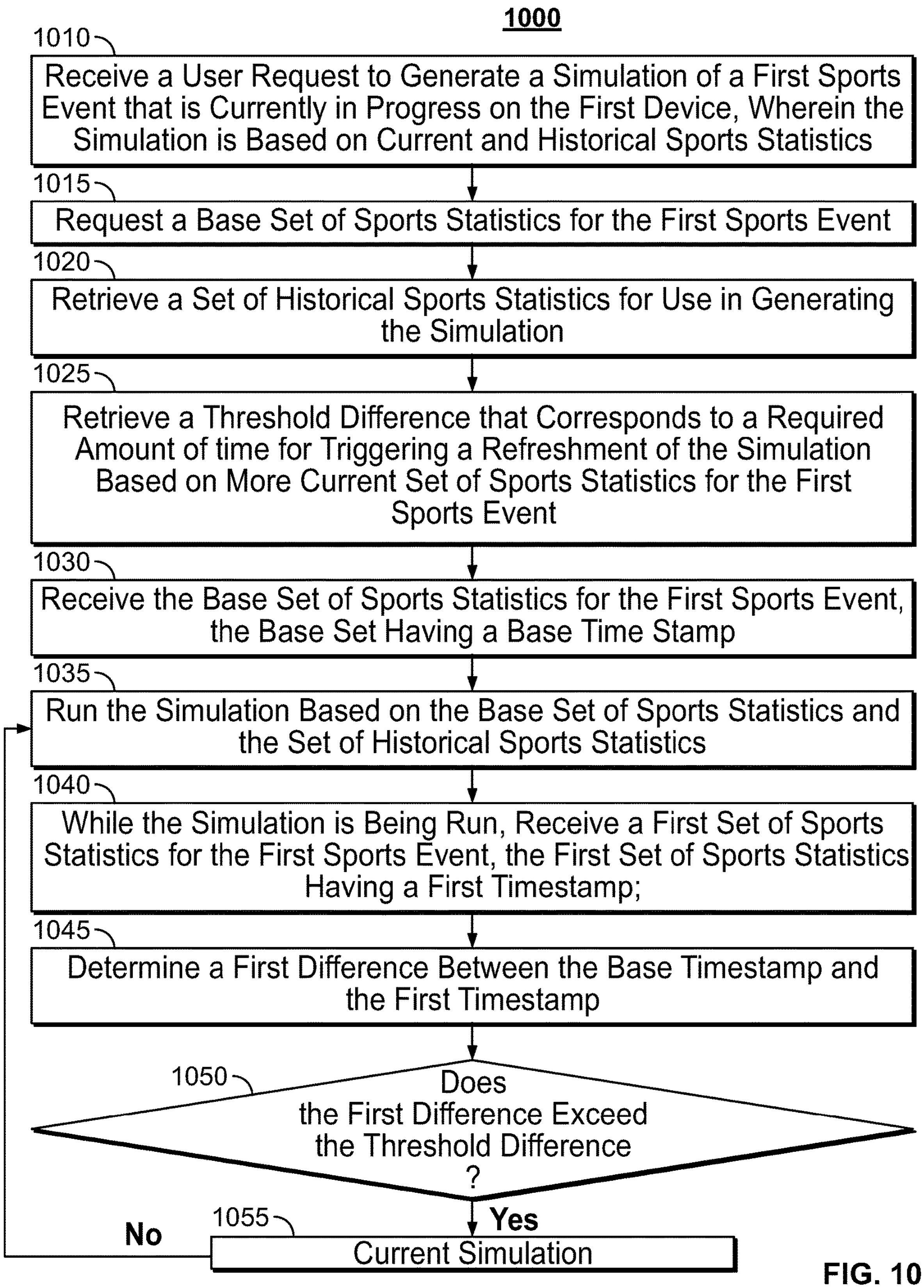

FIG. 10 is a flowchart of illustrative steps of a process 1000 for simulating a sports event in accordance with some embodiments of the disclosure. It should be noted that process 1000 or any step thereof could be performed on, or provided by, any of the devices shown in FIGS. 7-8. For example, process 1000 may be executed by control circuitry 704 (FIG. 7) as instructed by a media guidance application implemented on a user device (e.g., user equipment devices 802, 804, and/or 806 (FIG. 8)) in order to generate a simulation of a sports event. In addition, one or more steps of process 1000 may be incorporated into or combined with one or more steps of any other process or embodiment described herein.

Generating a simulation of a sports event may be performed following the steps depicted in the flowchart in FIG. 10. As shown, process 1000 begins with step 1010 where a media guidance application receives a user request to generate a simulation of a first sports event that is currently in progress on a first device. The user request may be received when a user is viewing a sports event on a display screen (e.g., 175 or 115, FIG. 1) and the user selects an option to generate a simulation of the sports event using an options window 120 or 180 (FIG. 1). The simulation may be generated by the media guidance application using current and historical sports statistics that may be received from a database of sports statistics, e.g., a media content source 816 (FIG. 8).

In order to generate the simulation, the media guidance application will require certain pieces of information. Control circuitry 704 for the media guidance application may request at step 1015 a base set of sports statistics for the first sports event. The base set of sports statistics may be requested from a sports database of sports statistics which can be provided in a table with timestamp information as shown in table 300 (FIG. 3). At step 1020, control circuitry 704 for the media guidance application may retrieve a set of historical sports statistics for use in generating the simulation. The historical statistics may be retrieved from a database of sports data. The control circuitry 704 for the media guidance application at step 1025 retrieves a threshold difference that corresponds to a required amount of time for triggering a refreshment of the simulation based on more current set of sports statistics for the first sports event. The threshold difference may be set by a user and may also be a default value. For example, the threshold difference for time may be set by the user so that the simulation is updated periodically, but not so often that the simulation ends up nearly mirroring the actual sports event. Providing the simulation of the game using historical statistics can be interesting to view to see how a game is supposed to occur given the historical data. Updating the data periodically allows the simulated game to catch up to reality.

In an example for a basketball game, the user may request a simulation of the basketball game, and the media guidance application may access NBA and sports news team data for each player on each team. A threshold time for updating the simulation may be set by a user at a period of every half of a quarter, thus updating every 6 minutes. Statistics for the game may be obtained from a sports database and used to update the simulation.

At step 1030, control circuitry 704 for the media guidance application will receive the base set of sports statistics for the first sports event, the base set of sports statistics having a base timestamp. The base timestamp for the base set of sports statistics may be associated with the base set of sports statistics (e.g., as shown in FIG. 3). The base timestamp may also correspond to a time that the base sports statistics are received by the media guidance application. Now that the media guidance application has the historical sports statistics, as well as a base set of sports statistics for the sports event, control circuitry 704 for the media guidance application will, at step 1035, run the simulation of the sports event based on the historical sports statistics and the base set of sports statistics for the sports event.

The simulation may be displayed on the display screen for the user to view. While the simulation is being run, additional details and data about the sports event may be received by the media guidance application. At step 1040, control circuitry 704 for the media guidance application may receive a first set of sports statistics for the first sports event. The first set of sports statistics may be received or pushed from the sports database, or provided in response to a request for additional sports data. The first set of sports statistics will have an associated first timestamp. To determine whether to use this new set of sports data for the simulation, control circuitry 704 for the media guidance application will analyze the timestamp information for the sets of sports data. At step 1045, control circuitry 704 for the media guidance application will determine a first difference between the base timestamp and the first timestamp. At step 1050, control circuitry 704 for the media guidance application will determine whether the first difference (between the base time stamp and the first time stamp) exceeds the threshold difference. E.g., using the half quarter example, a determination is made of whether the difference exceeds six minutes. If first time stamp exceeds the threshold difference, meaning that more time has passed between the base set of sports statistics and the first set of sports statistics than the threshold difference allows, and indicating that the sports statistics used in the simulation need to be refreshed, then the current iteration of the simulation may end. In this scenario, additional iterations of the simulation may be generated, as discussed herein with reference to FIG. 11. If, however, the first difference is less than the threshold difference, (e.g., less than six minutes in the half quarter basketball game example) meaning that the time between receiving the first set of sports statistics and the base statistics is not more than the threshold time, and so the simulation is considered to still be suitable in its use of the historical sports statistics and the base sports statistics, and so at step 1055, control circuitry 704 for the media guidance application will continue to run the simulation in the same form.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 10.

Figure 11:
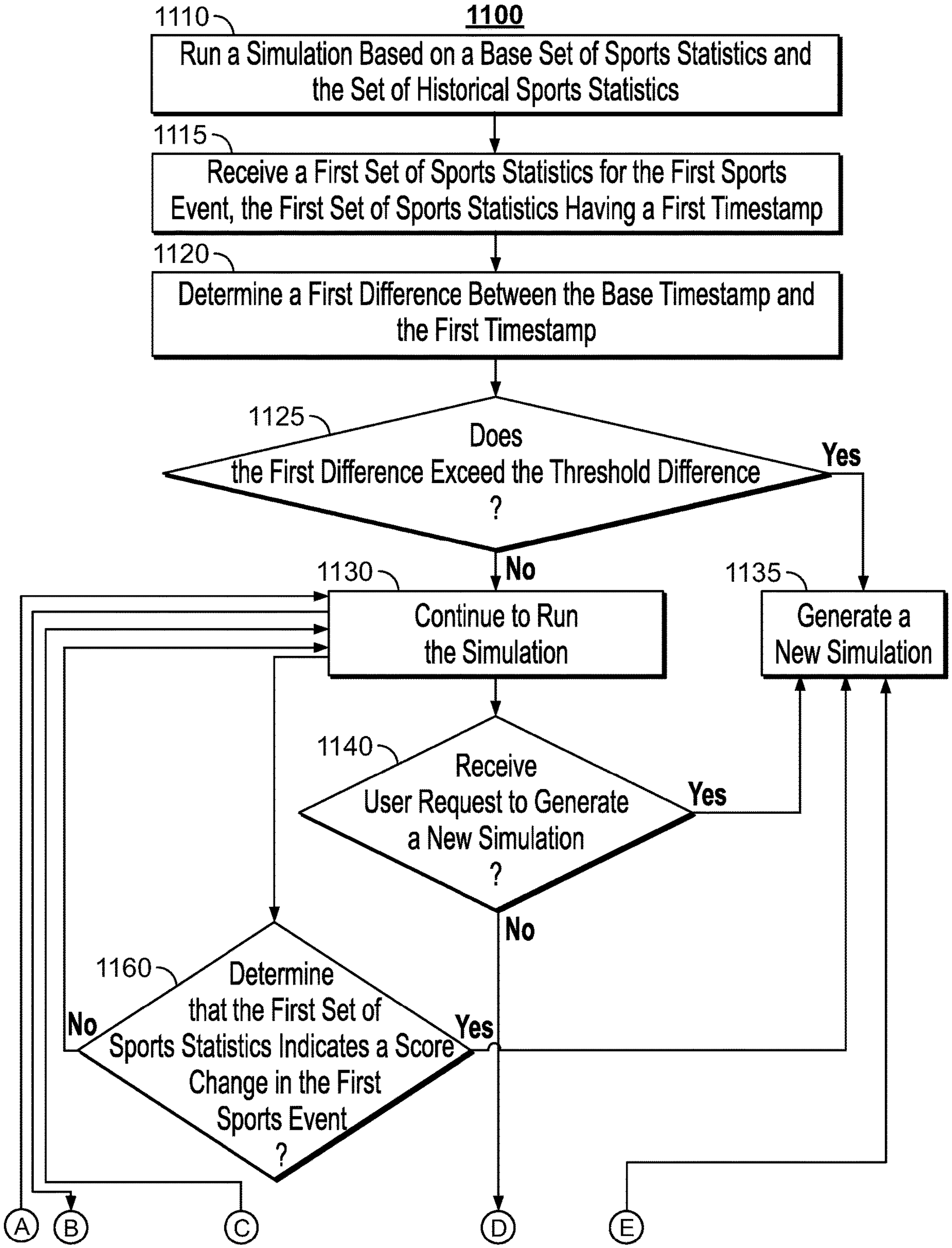
FIGS. 11-13 are flowcharts of illustrative processes for selecting a set of sports statistics for a simulation of a sports event and determining when to update a simulation of a sports event in accordance with some embodiments of the disclosure.
Figure 11:
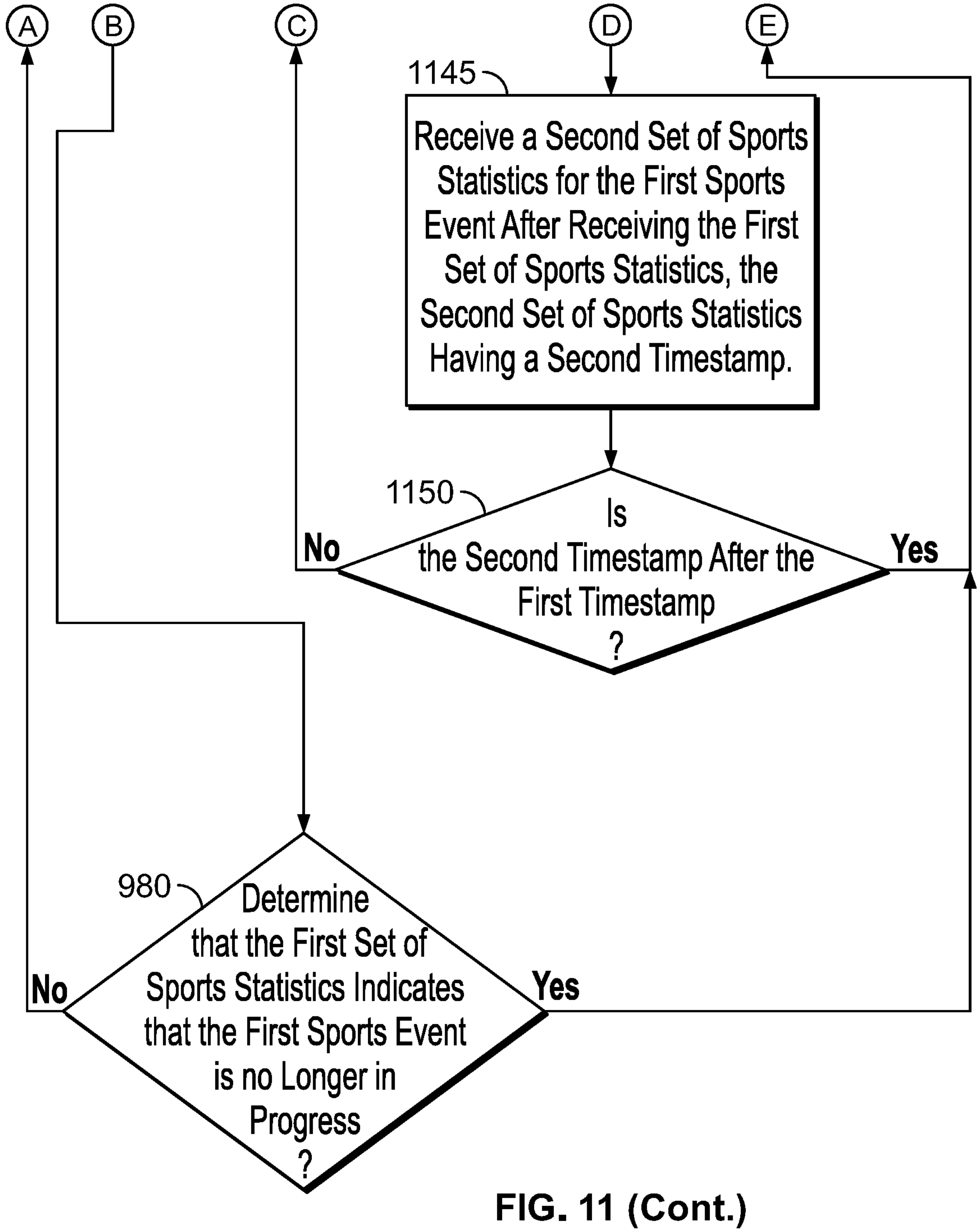

FIG. 11 is a flowchart of illustrative steps of a process 1100 for updating a simulation of a sports event. It should be noted that process 1100 or any step thereof could be performed on, or provided by, any of the devices shown in FIGS. 7-8. For example, process 1100 may be executed by control circuitry 704 (FIG. 7) as instructed by a media guidance application implemented on a user device (e.g., user equipment devices 802, 804, and/or 806 (FIG. 8)) in order to simulate a sports event. In addition, one or more steps of process 1100 may be incorporated into or combined with one or more steps of any other process or embodiment described herein.

To determine when to update a simulation with additional infusions of sports event data, an illustrative process 1100, shown in FIG. 11 may be followed. At step 1110, control circuitry 704 for the media guidance application may run a simulation based on a base set of sports statistics and a set of historical sports statistics that were received from a sports statistics database. The base set of sports statistics may be a set of sports statistics for the sports event that are received at the time that the time the simulation is initiated, either by user request, or by the media guidance application in response to determining that the user is no longer watching the sports event. The historical sports statistics may be from a sports database and may include historical statistics for the teams playing the sports event.

The simulation may be shown on a display for the user, e.g., as shown in FIGS. 2-3, alongside the sports event, or alone (e.g., on a separate device). As the simulation is being run and provided to the user, additional data about the event may be received. At step 1115 control circuitry 704 for the media guidance application may receive a first set of sports statistics for the sports event from a sports statistics data source. The first set of sports statistics will have a first timestamp, e.g., as shown in FIG. 4. The time stamp may be associated with sports statistics set and may indicate the time of the statistics or the time the statistics set is received by the media guidance application. To determine whether the simulation needs to be updated, time information for the data set is analyzed.

At step 1120, control circuitry 704 for the media guidance application may a first difference between the base timestamp and the first timestamp. These time stamps are associated with respective data sets and serve to show the relative freshness of the data sets, and help to inform a decision about whether to update the simulation of the sports event. At step 1125, control circuitry 704 for the media guidance application will determine whether the first difference (between the base timestamp and the first timestamp) exceeds the threshold difference. As discussed herein, the threshold difference may be set by a viewer as a preference for how current data needs to be for the simulation. In an example, for an NBA basketball game, a threshold of half of a period, six minutes, may be set as a threshold time. In another example of a threshold different setting, for a WNBA basketball game, a half period would be five minutes. The threshold difference may also be a default time. If the first difference does not exceed the threshold difference, meaning that the period between the base set of sports statistics and the first set of sports statistics is not long enough, then at step 1130, the control circuitry 704 for the media guidance application will continue to run the same simulation. If the first difference exceeds the threshold difference, meaning that the period between the base data and the first set of data is too great, then, the control circuitry 704 for the media guidance application will generate, at step 1135, a new simulation. The new simulation can be generated at step 1135 based, for example, the first set of sports statistics and the historical sports statistics.

The original version of the simulation, as well as the updated or new simulation may be a simulation that is run by the simulator application and can include an animation of the teams playing in the sports event. The simulation can also be certain plays that are expected to occur during the simulation period, i.e., for a basketball game, certain number of shots attempted and made, a certain number of blocks and steals by particular players, free throws, etc. The user may select to focus the simulation on one or more types of animations. For example, the user may wish to focus the simulation on only attempted and made shots.

When the media guidance application runs any version of the simulation of the sports event, e.g., the new simulation at step 1135, or continues the same simulation at step 1130, the iterative process to analyze data sets for updating the simulation will continue.

At step 1140, the control circuitry 704 for the media guidance application will determine whether there has been a request by the user to generate a new simulation. The request by the user may be entered, for example, using the options windows 120, 180 (FIG. 1). If a request for a new simulation has been received, the new simulation may be run at step 1135. If no request is received, the simulation may continue at step 1130.

Additional sets of sports statistics may continue to be received by the media guidance application, e.g., as streams of data or event data as shown in FIG. 4. At step 1145, the control circuitry 704 for the media guidance application may receive a second set of sports statistics for the first sports event after receiving the first set of sports statistics. The second set of sports statistics has a second timestamp. The control circuitry 704 for the media guidance application may determine whether the second timestamp is after the first timestamp. If it is, the second set of sports statistics may be selected by the control circuitry 704 for the media guidance application to use for generating a new simulation at 1135. In this scenario, the new simulation may be based on the second set of sports statistics and the set of historical sports statistics so that it is based on the more current set of sports statistics.

In another example of determining when to update a simulation of a sports event, at step 1160, control circuitry 704 for the media guidance application may determine that the first set of sports statistics indicates a score change in the first sports event. If a score change is found, at step 1170, control circuitry 704 for the media guidance application may generate a new simulation based on the first set of sports statistics and the set of historical sports statistics.

In another example of determining when to update a simulation of a sports event, control circuitry 704 for the media guidance application may determine at step 1180 that the first set of sports statistics indicates that the first sports event is no longer in progress. In this scenario, at step 1135, the control circuitry 704 for the media guidance application may generate a new simulation of the sports event based on the first set of sports statistics indicating that the game is no longer in progress and the set of historical sports statistics, e.g., as shown in FIG. 3.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 11.

Figure 12:
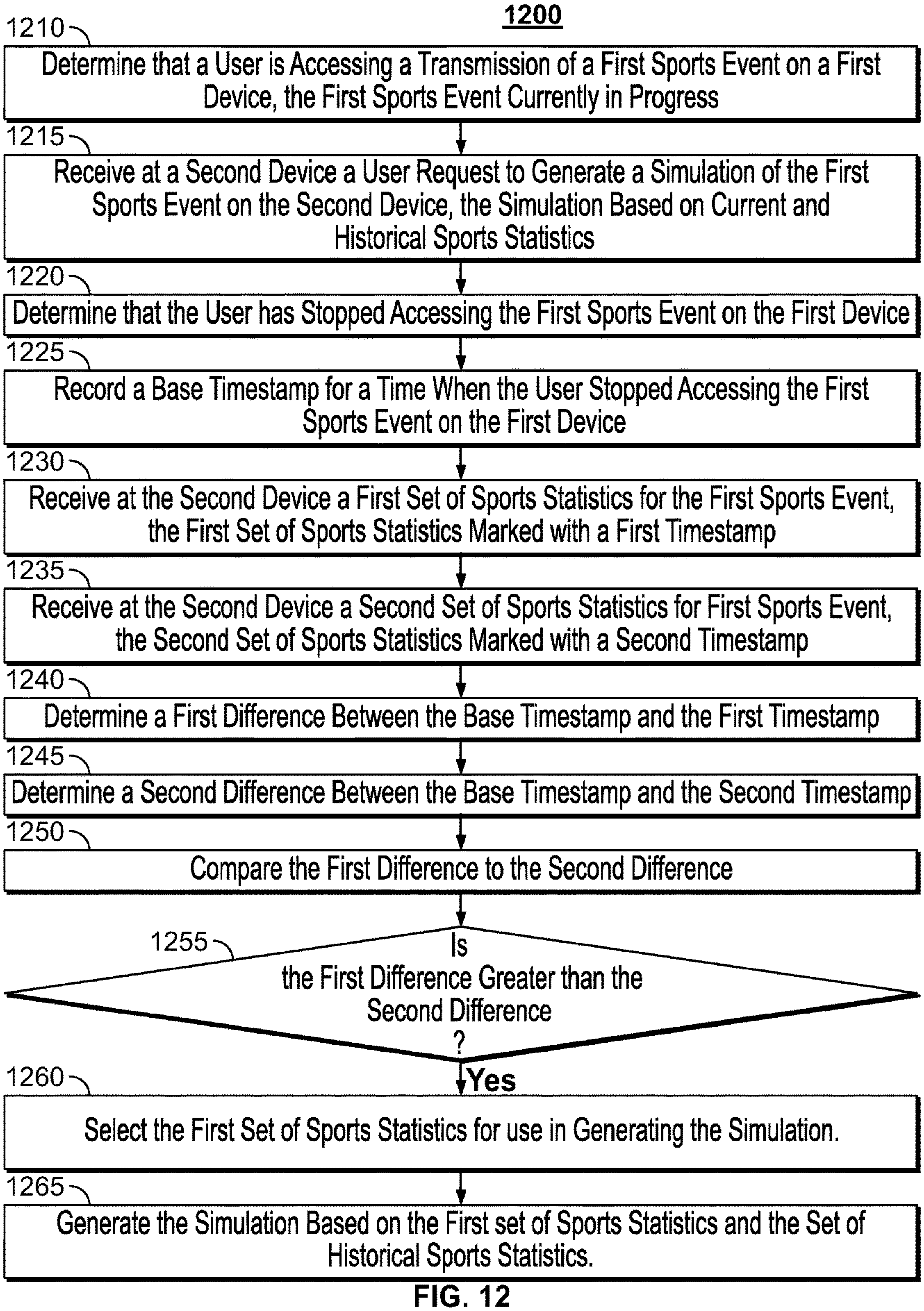

FIG. 12 is a flowchart of illustrative steps of a process 1200 for generating a simulation of a sports event. It should be noted that process 1200 or any step thereof could be performed on, or provided by, any of the devices shown in FIGS. 7-8. For example, process 1200 may be executed by control circuitry 704 (FIG. 7) as instructed by a media guidance application implemented on a user device (e.g., user equipment devices 802, 804, and/or 806 (FIG. 8)) in order to simulate a sports event. In addition, one or more steps of process 1200 may be incorporated into or combined with one or more steps of any other process or embodiment described herein.

FIG. 12 depicts an illustrative process 1200 for simulating a sports event according to an embodiment of the invention. At step 1210, control circuitry 704 for the media guidance application may determine that a user is accessing on a first device a transmission of a first sports event that is currently. At step 1215, control circuitry 704 for the media guidance application may receive at a second device a user request to generate a simulation of the first sports event on the second device, the simulation based on current and historical sports statistics. In an example, the user may be viewing a sport game on a television and may wish to view a simulation of the game on a portable device (e.g., devices 105 and 170, FIG. 1). The user may wish to view both at the same time to see the comparison of the versions, or perhaps the user needs to walk away from the main screen and will view the second device while walking away. In some examples, the user may not want to miss the actual event and so to keep thinking about the event, and to see a version of the event, the user may view the simulation on the second device.

At step 1220, control circuitry 704 for the media guidance application may determine that the user has stopped accessing the first sports event on the first device. This may occur if the user has to walk away from the first device. The media guidance application may make this determination in various ways, for example, using location information for the second device, detecting that a user is not interacting with the first device, using an in-home monitoring device that detects the user moving away from the first device location, or other technique. The control circuitry 704 for the media guidance application, at step 1225 may record a base timestamp for a time when the user stopped accessing the first sports event on the first device. The base time stamp may be recorded in a cache or memory for the media guidance application.

Data sets for the sports event may be received for use in generating the simulation of the sports event. At step 1230, the control circuitry 704 for the media guidance application may receive at the second device a first set of sports statistics for the first sports event, the first set of sports statistics marked with a first timestamp. In addition, at step 1235, the control circuitry 704 for the media guidance application may receive at the second device a second set of sports statistics for first sports event, the second set of sports statistics marked with a second timestamp. To determine whether to use the sports statistics for generating a simulation of the sports event, the control circuitry 704 for the media guidance application, at step 1240, may determine a first difference between the base timestamp and the first timestamp (i.e., a difference in the time since the user was determined to not be accessing the sports event, and the time stamp for the first set of sports statistics). In addition, the control circuitry 704 for the media guidance application, at step 1245 may determine a second difference between the base timestamp and the second timestamp (i.e., a difference in the time since the user was determined to not be accessing the sports event, and the time stamp for the second set of sports statistics). The control circuitry 704 for the media guidance application may compare the first difference to the second difference at step 1250. The control circuitry 704 for the media guidance application may decide at step 1255 if the first difference is greater than the second difference, meaning that the time associated with the first set of sports statistics is more recent than the time associated with the second set of sports statistics. If the first difference is greater, then the control circuitry 704 for the media guidance application will select at step 1260 the first set of sports statistics for use in generating the simulation. The selected set of sports statistics may be retrieved from memory or in real time from the sports database for use in generating, at step 1265 a simulation based on the first set of sports statistics and the set of historical sports statistics. In this way, the most recent sets of data are used for generating the simulation. As the simulation is run, steps of the other processes described herein with respect to updating the simulation may be performed.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 12.

Figure 13:
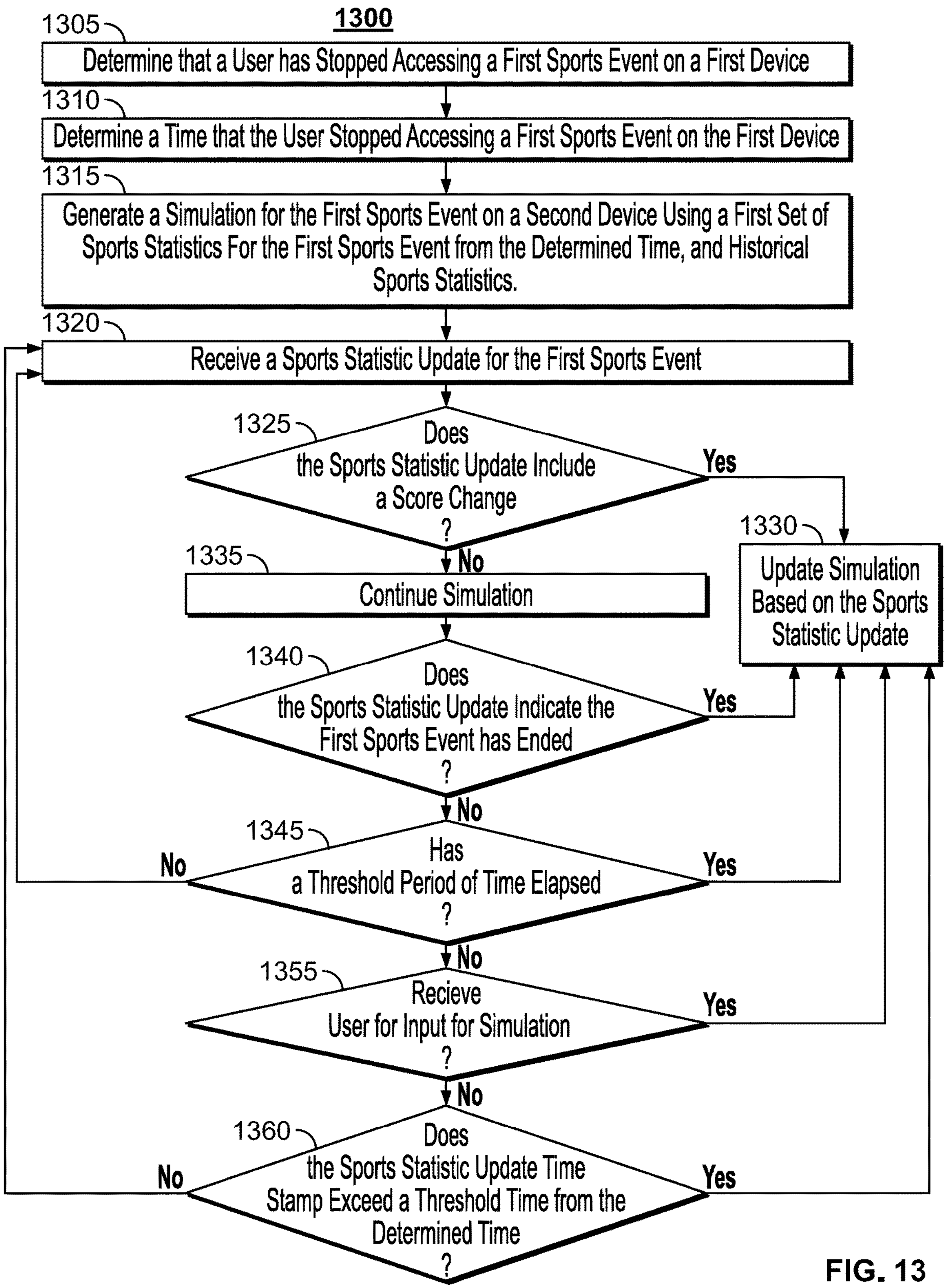

FIG. 13 is a flowchart of illustrative steps of a process 1300 for updating a simulation of a sports event in accordance with some embodiments of the disclosure. It should be noted that process 1300 or any step thereof could be performed on, or provided by, any of the devices shown in FIGS. 7-8. For example, process 900 may be executed by control circuitry 704 (FIG. 7) as instructed by a media guidance application implemented on a user device (e.g., user equipment devices 802, 804, and/or 806 (FIG. 8)) in order to simulate a sports event. In addition, one or more steps of process 1300 may be incorporated into or combined with one or more steps of any other process or embodiment described herein.

FIG. 13 depicts a process 1300 for determining when to update a simulation of a sports event when a user has stopped accessing a sports event, in accordance with some embodiments of the disclosure. For example, a user may view a sports event on a first device, and also has a second device, such as a smartphone to view additions versions or details about the sports event. At step 1305, control circuitry 704 for the media guidance application may determine that a user has stopped accessing a first sports event on a first device. In an example, the user may have had to walk away from the first device, such as a television in a living room. The media guidance application may make this determination in various ways, for example, using location information for the second device, detecting that a user is not interacting with the first device, using an in-home monitoring device that detects the user moving away from the first device location, or other technique. When the user has stopped accessing the first sports event on the first device, the control circuitry 704 for the media guidance application at step 1310 may determine a time that the user stopped accessing a first sports event on the first device. The determined time the user stopped accessing the first sports event on the first device may be recorded in memory by the control circuitry 704 for the media guidance application. At step 1315, the control circuitry 704 for the media guidance application may generate a simulation for the first sports event on a second device using a first set of sports statistics for the first sports event from the determined time, and historical sports statistics. The sports event data may be retrieved from a sports data database and time data for sets of sports data may be used with reference to the determined time so that the simulation is based on data from the time that the user stopped accessing the sports event.

When the sports simulation is being run on the second device using statistics data from the time the user stopped accessing the sports event on the first device and historical sports statistics, the control circuitry 704 for the media guidance application may receive additional sports statistics as the game continues. To determine whether to update the simulation, the control circuitry 704 for the media guidance application may analyze the sports statistics update for its suitability and relevance to the simulation. For example, at step 1320, the control circuitry 704 for the media guidance application may receive a sports statistic update for the first sports event. The sports statistic update may be received from a sports database and may be requested by the control circuitry 704 for the media guidance application or pushed periodically by the sports database. The control circuitry 704 for the media guidance application may analyze the sports statistic update at step 1325 to determine whether the sports statistic update includes a score change. The score change can be identified by the control circuitry 704 for the media guidance application by evaluating the event data (e.g., 420) to see if a score change is noted. In some scenarios, the control circuitry 704 for the media guidance application must compare score information against an earlier version of the sports statistics to determine whether a change has occurred. If a change in the score is detected at step 1325, the simulation may be updated based on the sports statistics update by the control circuitry 704 for the media guidance application at step 1330. If no change in score is detected a step 1325, the same simulation may continue at step 1335.

As the simulation continues or is updated, and as new sets of sports statistics are received, the control circuitry 704 for the media guidance application may analyze the sports statistics updates to determine at step 1340 whether the sports statistic update indicate the first sports event has ended. If a game is over, then the user may wish for the simulation to show that the game has ended. Thus, if the control circuitry 704 for the media guidance application determines that the game has ended, at step 1340, the simulation may be updated by the control circuitry 704 for the media guidance application based on the sports statistic update. If, however, the game is determined at step 1340 to continue, the control circuitry 704 for the media guidance application may determine at step 1345 whether a threshold period of time elapsed, i.e., determining whether the simulation data set is still suitable. If the threshold period of time has elapsed, meaning that the data set is too old, then the control circuitry 704 for the media guidance application may update the simulation based on the sports statistic update at 1130. If, however, the control circuitry 704 for the media guidance application determines that the threshold period of time has not been met, i.e., because the data set is not too old, then the same simulation may continue using the same set of data. The threshold period of time may be set by a user or be set as a default time period so that the simulation data is not updated so frequently that it is a mirror the actual game. In a basketball example, the threshold time period may be half a quarter, so for an NBA game, a threshold setting of six minutes. Simulations that run with data sets that are older than six minutes would then need to be updated with a new set of data, but simulations running with a data set that is less than six minutes old would continue to run.

As the simulation continues or is updated in its various versions of updates, the control circuitry 704 for the media guidance application may periodically prompt a user for input. For example, at step 1355, the user may be prompted with an options window (e.g., 120 and 180, FIG. 1) for updating a simulation. If the user does not request an update, then the same simulation version will continue to run.

In another example, another basis for updating the simulation of the sports event may be time based. At step 1360, the control circuitry 704 for the media guidance application may determine whether the sports statistic update time stamp exceeds a threshold time from the determined time. The time threshold may be set by a user or be a default time to make the simulation relatively current but not updated so frequently that it tracks the sports event too closely. If the control circuitry 704 for the media guidance application determines that the time threshold is exceeded, the control circuitry 704 for the media guidance application may update the simulation based on the sports statistic update at step 1330. If, however, the time threshold is not exceeded, then the existing simulation may continue since the data that it is based upon is not too stale. The iterations of the processes described herein may continue to keep the simulation of the sports event current and relevant to the viewer.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 13.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of determining when to refresh data used to generate simulated sports events based on user behavior, the method comprising:

determining that a user is accessing a transmission of a first sports event on a first device, wherein the first sports event is currently in progress;

receiving, at a second device, a user request to generate a simulation of the first sports event on a second device, wherein the simulation is based on current and historical sports statistics;

determining that the user has stopped accessing the first sports event on the first device;

in response to determining that the user has stopped accessing the first sports event on the first device, recording a base timestamp in memory, wherein the base timestamp corresponds to a time when the user stopped accessing the first sports event on the first device;

receiving, at the second device, a plurality of sets of sports statistics for the first sports event, wherein the plurality of sets of sports statistics are transmitted via an Internet protocol;

marking, at the second device, each of the received sets of sports statistics with a timestamp indicating a time when the respective set of sports statistics was received at the second device;

determining a most recent set of sports statistics based on a comparison between the base timestamp and the respective timestamps associated with the plurality of sets of sports statistics;

using only the most recent set of sports statistics and not using the other sets of sports statistics of the plurality of sets of sports statistics in generating the simulation;

retrieving a set of historical sports statistics for use in generating the simulation from the memory; and generating the simulation based on the most recent set of sports statistics and the set of historical sports statistics.

2. The method of claim 1, further comprising:

determining that a time when a first set of sports statistics was received at the second device is after the time when the user stopped accessing the first sports event on the first device; and determining a first difference in response to determining that the time when the first set of sports statistics was received at the second device is after the time when the user stopped accessing the first sports event on the first device.

3. The method of claim 2, further comprising:

determining that the time when the first set of sports statistics was received at the second device is a first threshold amount of time after the time when the user stopped accessing the first sports event on the first device; and determining the first difference in response to determining that the time when the first set of sports statistics was received at the second device is the first threshold amount of time after the time when the user stopped accessing the first sports event on the first device.

4. The method of claim 3, wherein the first threshold amount of time is set by a user.

5. The method of claim 1, further comprising:

after generating the simulation, receiving, at the second device, a third set of sports statistics for the first sports event, wherein the third set of sports statistics is transmitted via the Internet protocol, and wherein the third set of sports statistics is marked with a third timestamp indicating a time when the third set of sports statistics was received at the second device;

determining that the time when the third set of sports statistics was received at the second device is a second threshold amount of time after a time when the simulation was generated; and in response to determining that the time when the third set of sports statistics was received at the second device is the second threshold amount of time after the time when the simulation was generated, generating a new simulation based on the third set of sports statistics and the set of historical sports statistics.

6. The method of claim 5, wherein the second threshold amount of time is set by a user.

7. The method of claim 1, further comprising:

receiving, at the second device, a fourth set of sports statistics for the first sports event, wherein the fourth set of sports statistics is transmitted via the Internet protocol, and wherein the fourth set of sports statistics is marked with a fourth timestamp indicating a time when the fourth set of sports statistics was received at the second device;

determining that the fourth set of sports statistics indicates a score change in the first sports event; and in response to determining that the fourth set of sports statistics indicates the score change in the first sports event, generating a new simulation based on the fourth set of sports statistics and the set of historical sports statistics.

8. The method of claim 1, further comprising:

receiving, at the second device, a fifth set of sports statistics for the first sports event, wherein the fifth set of sports statistics is transmitted via the Internet protocol, and wherein the fifth set of sports statistics is marked with a fifth timestamp indicating a time when the fifth set of sports statistics was received at the second device;

determining that the fifth set of sports statistics indicates that the first sports event is no longer in progress; and in response to determining that the fifth set of sports statistics indicates that the first sports event is no longer in progress, generating a new simulation based on the fifth set of sports statistics and the set of historical sports statistics.

9. The method of claim 1, further comprising:

determining that the user has resumed accessing the transmission of the first sports event on the first device; and in response to determining that the user has resumed accessing the transmission of the first sports event on the first device, prompting the user to generate a new simulation.

10. A system of determining when to refresh data used to generate simulated sports events based on user behavior, the system comprising:

input/output (I/O) interface circuitry configured to receive a user input; and control circuitry configured to:

determine that a user is accessing a transmission of a first sports event on a first device, wherein the first sports event is currently in progress;

receive, at a second device, a user request to generate a simulation of the first sports event on a second device, wherein the simulation is based on current and historical sports statistics;

determine that the user has stopped accessing the first sports event on the first device;

in response to determining that the user has stopped accessing the first sports event on the first device, record a base timestamp in memory, wherein the base timestamp corresponds to a time when the user stopped accessing the first sports event on the first device;

receive, at the second device, a plurality of sets of sports statistics for the first sports event, wherein the plurality of sets of sports statistics are transmitted via an Internet protocol;

mark each of the sets of sports statistics with a timestamp indicating a time when the respective set of sports statistics was received at the second device;

determine a most recent set of sports statistics based on a comparison between the base timestamp and the respective timestamps associated with the plurality of sets of sports statistics;

use the most recent set of sports statistics and not use the other sets of sports statistics of the plurality of sets of sports statistics in generating the simulation;

retrieve a set of historical sports statistics for use in generating the simulation from the memory; and generate the simulation based on the most recent set of sports statistics and the set of historical sports statistics.

11. The system of claim 10, wherein the control circuitry is further configured to:

determine that a time when a first set of sports statistics was received at the second device is after the time when the user stopped accessing the first sports event on the first device; and determine a first difference in response to determining that the time when the first set of sports statistics was received at the second device is after the time when the user stopped accessing the first sports event on the first device.

12. The system of claim 11, wherein the control circuitry is further configured to:

determine that the time when the first set of sports statistics was received at the second device is a first threshold amount of time after the time when the user stopped accessing the first sports event on the first device; and determine the first difference in response to determining that the time when the first set of sports statistics was received at the second device is the first threshold amount of time after the time when the user stopped accessing the first sports event on the first device.

13. The system of claim 12, wherein the first threshold amount of time is set by a user.

14. The system of claim 10, wherein the control circuitry is further configured to:

after generating the simulation, receive, at the second device, a third set of sports statistics for the first sports event, wherein the third set of sports statistics is transmitted via the Internet protocol, and wherein the third set of sports statistics is marked with a third timestamp indicating a time when the third set of sports statistics was received at the second device;

determine that the time when the third set of sports statistics was received at the second device is a second threshold amount of time after a time when the simulation was generated; and in response to determining that the time when the third set of sports statistics was received at the second device is the second threshold amount of time after the time when the simulation was generated, generate a new simulation based on the third set of sports statistics and the set of historical sports statistics.

15. The system of claim 14, wherein the second threshold amount of time is set by a user.

16. The system of claim 10, wherein the control circuitry is further configured to:

receive, at the second device, a fourth set of sports statistics for the first sports event, wherein the fourth set of sports statistics is transmitted via the Internet protocol, and wherein the fourth set of sports statistics is marked with a fourth timestamp indicating a time when the fourth set of sports statistics was received at the second device;

determine that the fourth set of sports statistics indicates a score change in the first sports event; and in response to determining that the fourth set of sports statistics indicates the score change in the first sports event, generate a new simulation based on the fourth set of sports statistics and the set of historical sports statistics.

17. The system of claim 10, wherein the control circuitry is further configured to:

receive, at the second device, a fifth set of sports statistics for the first sports event, wherein the fifth set of sports statistics is transmitted via the Internet protocol, and wherein the fifth set of sports statistics is marked with a fifth timestamp indicating a time when the fifth set of sports statistics was received at the second device;

determine that the fifth set of sports statistics indicates that the first sports event is no longer in progress; and in response to determining that the fifth set of sports statistics indicates that the first sports event is no longer in progress, generate a new simulation based on the fifth set of sports statistics and the set of historical sports statistics.

18. The system of claim 10, wherein the control circuitry is further configured to:

determine that the user has resumed accessing the transmission of the first sports event on the first device; and in response to determining that the user has resumed accessing the transmission of the first sports event on the first device, prompt the user to generate a new simulation.

* * * * *